UNITED STATES PATENT OFFICE 2,592,107

SYNTHETIC AMPHOTERIC POLYMERS CONTAINING FREE AMINO GROUPS AND FREE ACID GROUPS

Julian L. Azorlosa, Wilmington, Del., assignor to Hercules Powder Company, Wilmington, Del., a corporation of Delaware No Drawing. Application November 19, 1948, Serial No. 61,133

12 Claims. (Cl. 260—80.5)

This invention relates to synthetic amphoteric polymers and more particularly to amphoteric polymers prepared by hydrolyzing copolymers which contain groups capable of producing basic and acidic groups on hydrolysis.

There are many amphoteric substances which may be obtained from natural sources as, for example, the proteinaceous materials such as casein, zein, soya protein, etc. These products are disadvantageous in that they are all subject to bacterial and enzymatic decomposition. In addition, being derived from natural products, they exhibit variations in their properties from one preparation or one source to another.

Now in accordance with this invention it has been found that amphoteric polymers may be synthesized by the hydrolysis of a copolymer of an amine containing a vinyl radical or an N-acyl derivative thereof and a compound having the formula

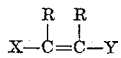

where R is one of the group consisting of hydrogen, alkyl, aryl and aralkyl, X is one of the group consisting of hydrogen,

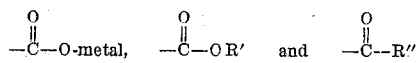

and Y is one of the group consisting of —CN,

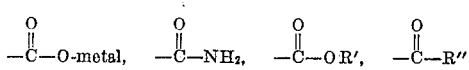

—SO₃-metal, —SO₂NH₂, and —SO₃R' where R' is an organic radical and R'' is oxygen common to both the X and Y groups. These new synthetic amphoteric polymers have many advantages over the natural amphoteric materials such as proteins in that they are not subject to bacterial or enzymatic putrefaction and their composition may be controlled so that consecutive batches are identical and have the same properties. They are also superior to the proteins in that the monomer units of these synthetic polymers are linked by carbon to carbon bonds and, therefore, are very resistant to hydrolysis, whereas the proteins readily hydrolyze, the polymer chain breaking to yield amino acids. In addition, it is possible to vary the molecule as desired so as to produce a product having any desired range of solubility, etc.

The following examples illustrate the preparation of the new amphoteric polymers in accordance with this invention. All parts and percentages are by weight unless otherwise indicated.

EXAMPLES 1-4

Copolymers of 2-vinylpyridine and methyl acrylate were prepared using varying amounts of tert-alkyl mercaptan in the copolymerization. The tert-alkyl mercaptan used was a commercial mixture of $C_{12}$, $C_{14}$, and $C_{16}$ alkyl mercaptans. In each case 52.5 parts of vinylpyridine, 43 parts of methyl acrylate, 0.48 part of benzoyl peroxide and from 0.25 to 1.25% of the mercaptan (based on the total monomer weight) were polymerized in a sealed container under an atmosphere of nitrogen by heating to 38.5° C. for 18 to 22 hours. After polymerization, the polymers were dissolved in benzene and precipitated by the slow addition of the benzene solutions to an excess of hexane. The composition of these polymers and their specific viscosities in benzene solution are given in Table I below.

Each of the above polymers was hydrolyzed by refluxing a solution of the polymer in a 12% solution of hydrochloric acid. When hydrolysis was complete each solution was poured into 6.5% aqueous solution of sodium hydroxide. These solutions were then heated to 80° C. and 5% hydrochloric acid or 5% sodium hydroxide was added until coagulation was complete. The precipitated hydrolyzate was permitted to settle and the supernatant liquid removed. Each product was washed repeatedly with hot water, small amounts of sodium hydroxide or hydrochloric acid being added to maintain coagulation of the polymer. These products were then dried in a vacuum oven at 62° C.

Table I

| Example Number | Percent Mercaptan | Mole Percent Monomers in Polymer | | Specific Viscosity 1% in Benzene | Precipitated at pH |
|---|---|---|---|---|---|
| | | Vinyl Pyridine | Methyl Acrylate | | |
| 1 | 0.25 | 67 | 33 | 0.417 | 4.40 |
| 2 | 0.50 | 63 | 37 | 0.320 | 5.31 |
| 3 | 0.75 | 62 | 38 | 0.268 | 5.28 |
| 4 | 1.00 | 65 | 35 | 0.223 | 5.52 |

EXAMPLE 5

A solution of 42.8 parts of 2-vinylpyridine, 35 parts of methyl acrylate, and 1.00 part of 30% hydrogen peroxide was polymerized in a vacuum at 50° C. for 5 hours and then at 70° C. for 7 days. The resulting polymer was dissolved in 700 parts of anhydrous alcohol and reprecipitated by pouring into an excess of water. The polymer was dried and found to have a specific viscosity of 0.73 as an 0.5% solution in anhydrous alcohol.

This polymer was hydrolyzed by refluxing with a 40% excess of an 11% solution of potassium hydroxide in anhydrous alcohol for 5 hours. The reaction mixture was then diluted with water and dilute hydrochloric acid was added until the polymer was completely precipitated, care being taken to avoid the addition of too much hydrochloric which redissolved the precipitate. On titrating a solution containing 0.99 part of copolymer and 0.0053 equivalent of hydrogen chloride, the hydrolyzate was found to be insoluble in the pH range of 4.2 to 6.0. This hydrolyzate had the following mole per cent composition: 62% 2-vinylpyridine, 31% acrylic acid, 7% methyl acrylate.

EXAMPLE 6

A mixture of 5 parts of 2-vinylpyridine, 5 parts of acrylonitrile, 0.5% tert-alkyl mercaptan, and 0.25% benzoyl peroxide was polymerized in a sealed container at 50° C. for 21.5 hours. The polymer was dissolved in 100 parts of benzene and reprecipitated by pouring into 500 parts of hexane. The polymer was dried in a vacuum oven at 47° C. It had a specific gravity in 0.5% benzene solution of 0.222.

The above polymer was hydrolyzed by refluxing with an aqueous solution of 12% hydrochloric acid for 24 hours. The hydrolyzate was found to be soluble at all pH values at room temperature but was insoluble at a pH of 5 to 6 at 80° C.

EXAMPLE 7

A mixture of 47.8 parts of 2-vinylpyridine, 12.2 parts of acrylonitrile and 1.20 parts of 60% tert-butyl hydroperoxide was polymerized under vacuum at 60° C. for 42 hours. The polymer was dissolved in anhydrous ethanol and reprecipitated by the addition of water. The specific viscosity of an 0.5% solution in anhydrous ethanol was 1.24.

This copolymer was hydrolyzed by heating it in a 50% solution of sulfuric acid at 110° C. for 40 hours. The amphoteric polymer was precipitated by the addition of aqueous sodium hydroxide. It was redissolved by the addition of excess sodium hydroxide and reprecipitated at a pH of 4.75 by the addition of 6 N hydrochloric acid. On analysis it was found to contain 2 pyridine groups to 1 acid group. On titrating a sodium hydroxide solution of the polymer with hydrochloric acid and back-titrating it was found to be insoluble at a pH of 4.3 to 5.7.

EXAMPLE 8

A mixture of 45 parts of 2-vinylpyridine, 45 parts of acrylonitrile, 10 parts of styrene, 0.50% tert-alkyl mercaptans, and 0.25% of benzoyl peroxide was polymerized by heating in a sealed container at 50° C. for 21.5 hours. The copolymer was dissolved in benzene and reprecipitated by pouring the benzene solution into an excess of hexane. The polymer was filtered and dried at 47° C. in a vacuum oven. It had a specific viscosity in an 0.5% benzene solution of 0.219.

The above copolymer was hydrolyzed by refluxing in a 12% aqueous solution of hydrochloric acid for 24 hours. The hydrolyzate was then precipitated by the addition of aqueous sodium hydroxide. This amphoteric polymer was insoluble in the pH range of 2.1 to 5.9.

EXAMPLES 9-11

In these examples a mixture of 2-vinylpyridine, methyl acrylate and styrene was polymerized in the presence of tert-alkyl mercaptan and benzoyl peroxide by heating in a sealed container to 38.5° C. for 53 hours. The ratio of monomers used, amount of mercaptan and catalyst are given in the table below. In each case after polymerization, the polymer was dissolved in benzene and then precipitated by pouring the benzene solution into hexane. The polymers were dried at 65° C. in a vacuum oven.

Each of the above copolymers was hydrolyzed by refluxing with a solution of 9% aqueous hydrochloric acid for 6-7 hours. The amphoteric hydrolyzates were then precipitated by the addition of aqueous sodium hydroxide. The pH at which these hydrolyzates precipitated and the range of pH at which they are insoluble are given in the table below.

*Table II*

| Example No. | Mole Per Cent | | | Per Cent Mercaptan | Per Cent Peroxide | Specific Viscosity 0.5% Benzene | Hydrolyzed Polymer | |
|---|---|---|---|---|---|---|---|---|
| | Vinyl Pyridine | Methyl Acrylate | Styrene | | | | Precipitated at pH | Insoluble at pH |
| 9 | 40 | 40 | 20 | 1.0 | 1.0 | 0.135 | 4.0 | 2.7-6.3 |
| 10 | 40 | 40 | 20 | 1.5 | 1.0 | 0.101 | 4.7 | 2.5-6.6 |
| 11 | 35 | 35 | 30 | 0.5 | 0.75 | 0.191 | 4.2 | 2.4-6.3 |

*Example 12*

A solution of 43 parts of methyl acrylate, 49.5 parts of N-allyl acetamide and 4.63 parts of benzoyl peroxide was polymerized in vacuum at 40° C. for 48 hours and then at 65° C. for 16 hours. The viscous polymer was dissolved in 500 parts of acetone and precipitated by pouring the acetone solution into water. It was dried at 75° C. in a vacuum oven and then analyzed. The nitrogen content of 2.09% indicates the ratio of methyl acrylate to N-allyl acetamide in the polymer to be 7:1. The polymer had a molecular weight as determined in acetone of 5000 to 8000 and had a softening point of 70° C. The specific viscosity of a 5% acetone solution was 1.242.

The above copolymer was hydrolyzed by refluxing it in a solution of 12% aqueous hydrochloric acid for 1.5 hours. The hydrolyzed polymer was precipitated by adding an aqueous solution of sodium hydroxide; it was slowly soluble in alkali. Maximum precipitation appeared at a pH of 4.6. The hydrolyzed polymer contained 2.26% nitrogen which indicates a ratio of acrylic acid units to allyl amine units of 8:1.

In accordance with this invention a synthetic amphoteric polymer may be obtained by hydrolyzing copolymers which contain groups capable of producing basic or acidic groups on hydrolysis.

The copolymers which are hydrolyzed may be prepared by the copolymerization of an amine containing a vinyl radical or the N-acyl-substituted derivatives thereof and a compound having the formula

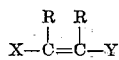

where R is one of the group consisting of hydrogen, alkyl, aryl and aralkyl, X is one of the group consisting of hydrogen

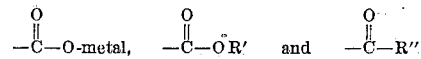

and Y is one of the group consisting of $$-CN, \quad -\overset{O}{\underset{\|}{C}}-O\text{-metal}, \quad -\overset{O}{\underset{\|}{C}}-NH_2, \quad -\overset{O}{\underset{\|}{C}}-OR', \quad -\overset{O}{\underset{\|}{C}}-R''$$

—$SO_3$-metal, —$SO_2NH_2$, and —$SO_3R'$ where R' is an organic radical and R'' is oxygen common to both the X and Y groups. These copolymerizable compounds may also be defined as vinyl, vinylidene, or vinylene compounds containing potential acid-forming groups. Exemplary of these compounds which may be copolymerized with the vinyl amines are the acrylic compounds such as acrylonitrile, methacrylonitrile, salts of acrylic and methacrylic acids, such as the alkali metal, alkaline earth metal salts, acrylamide, methacrylamide, and the alkyl, aryl, aralkyl, cycloalkyl, etc., esters of acrylic and methacrylic acids such as methyl acrylate, ethyl acrylate, methyl methacrylate, ethyl methacrylate, etc.; the fumaric- and maleic-type compounds such as the salts, esters or anhydrides of maleic and fumaric acids; and olefin sulfonic acid derivatives such as the salts, esters or amides of vinyl sulfonic acid, styrene sulfonic acids, etc.

The amine which is copolymerized with the acrylic compound may be any polymerizable amine and preferably is an amine containing a vinyl radical. The amine may be a primary, secondary, or tertiary amine, an aliphatic, heterocyclic, cycloaliphatic, or aromatic amine, which amines contain the vinyl radical. Typical examples of the amines which may be copolymerized are the aliphatic amines such as allylamine, etc., aromatic amines such as p-amino styrene, etc., and heterocyclic amines such as the vinylpyridines. Any vinylpyridine may be used as, for example 2-, 3-, or 4-vinylpyridine, or the alkyl vinylpyridines such as 2-methyl-5-vinylpyridine, 4-methyl-2-vinylpyridine, 2-ethyl-5-vinylpyridine, etc. In carrying out the copolymerization of the amine with the monomer containing potential acid groups it may be necessary to protect the amino group by acylation and use the N-acyl-substituted amine in the polymerization reaction. The acyl group may be the acid radical of any organic acid. To illustrate, in Example 12, above, the amino group of allylamine was protected by acetylation to form N-allyl acetamide before copolymerizing this amine with the methyl acrylate. When a tertiary amine such as a vinylpyridine is used in the copolymerization reaction it is usually not necessary to protect the amino group.

It is frequently desirable to modify these copolymers by the addition of a third polymerizable monomer during the copolymerization reaction. Examples 8 to 11 illustrate preparation of ternary copolymers which may be hydrolyzed to form amphoteric polymers in accordance with this invention. Polymerizable monomers which may be added during the polymerization of the amine and the monomer containing potential acid groups are those containing a $CH_2=C<$ group. Exemplary of such monomers are the vinyl aromatics such as styrene, alkyl-substituted styrenes, halostyrenes, etc., vinyl chloride, vinylidene chloride, vinyl esters such as vinyl acetate, allyl acetate, etc., and conjugated diolefins such as butadiene, isoprene, chloroprene, 2,3-dimethyl butadiene, etc.

The copolymers which are hydrolyzed to prepare the synthetic amphoteric polymers of this invention may be made up of any desired proportion of amine and copolymerizable monomer. Obviously the ratio of monomers may be varied over a wide range but should be such as to yield a polymer which will have a sufficient number of both acid and basic groups. In general, the ratio of monomers will depend upon the reactivity of the specific monomers used. For example, when vinylpyridine is used as the amine, it has a high polymerization activity and consequently even when used in mole to mole ratio with an acrylic compound, the copolymer will contain more pyridine units than acid units. Accordingly, it may be desirable to use a larger proportion of the acrylic compound. In the case of the ternary polymers the amount of the third monomer to be incorporated will depend upon the desired properties of the amphoteric material. For example, when a neutral monomer such as styrene is added, an amount up to 10 mole per cent may be added and still retain acid solubility. On the other hand, 20 to 30 mole per cent of a neutral monomer may be added if the amount of mercaptan used is also increased.

The copolymerization of the amine and the copolymerizable compound may be carried out by emulsion or homogeneous polymerization methods. Either the standard emulsion polymerization formula or the Redox-type systems may be used. In carrying out the emulsion polymerization of the amine and acrylic, fumaric, or olefin sulfonic compound, any type of emulsifying agent as, for example, fatty acid soaps, dehydrogenated rosin soap, etc., or alkyl sulfates may be used. In carrying out the homogeneous polymerization, either bulk or solution polymerization may be used; i. e., the monomers may be simply mixed and heated or dissolved in a mutual solvent and heated to the desired polymerization temperature. The homogeneous polymerizations may be carried out in vacuum or in an atmosphere of nitrogen or oxygen. In either method a polymerization catalyst is used as, for example, potassium persulfate, hydrogen peroxide, organic peroxides such as ethyl peroxide, benzoyl peroxide, acetyl peroxide, tert-butyl hydroperoxide, or any other free radical-producing compound. Any of the usual modifiers such as the alkyl mercaptans may be added to the polymerization formulae. Typical of the alkyl mercaptans which may be used as modifiers are the commercial mixtures of mercaptans known as primary and tertiary mercaptans. These are mixtures of alkyl mercaptans containing 10, 12 and 14 carbon atoms and 12, 14 and 16 carbon atoms, respectively.

The hydrolysis of the copolymers, in accordance with this invention, may be carried out by heating the copolymer with either acid or alkali as a hydrolyzing agent. The hydrolysis may be carried out in aqueous, alcoholic or other solution. The use of acid or alkali for bringing about the hydrolysis will depend upon the type of copolymer being hydrolyzed. If the copolymer contains nitrile groups, usually an acid is used for the hydrolysis. On the other hand, if the copolymer contains ester groups which are to be hydrolyzed, an alkali may be more effective for carrying out the hydrolysis. Any mineral acid may be used for bringing about the hydrolysis as, for example, sulfuric acid, hydrochloric acid, phosphoric acid, etc. Among the alkalies which may be mentioned for bringing about the hydrolysis are the alkali metal hydroxides such as sodium hydroxide, potassium hydroxide, etc. The temperature at which the hydrolysis takes place may be from about 50° C. to about 125° C. and preferably is from about 90° C. to about 110° C. The solution of the hydrolyzate may be used directly or the hydrolyzate may be isolated by adjusting the pH of the solution to the isoelectric point of the polymer.

The hydrolyzates of the amine-acrylic or amine-fumaric copolymers exhibit amphoteric properties due to the presence of both free amino groups and free carboxylic acid groups. In the same way, the hydrolyzates of the amine-olefin sulfonic copolymers exhibit amphoteric properties due to the presence of both free amino groups and free sulfonic acid groups. Consequently, these hydrolyzates are soluble in both alkali and acid solutions but are insoluble at specific pH ranges intermediate between the strongly acid and strongly alkaline side. Thus, they act in every way like the naturally-occurring protein materials. The pH at which a specific hydrolyzate will precipitate will depend upon the type of copolymer which is hydrolyzed.

The synthetic amphoteric polymers produced in accordance with this invention may be used as substitutes for naturally-occurring proteins in many applications, one of the outstanding uses being in their substitution for casein in rosin size emulsions.

What I claim and desire to protect by Letters Patent is:

1. An amphoteric polymer comprising the hydrolyzate of a copolymer of a vinylpyridine and a compound having the formula

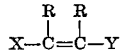

where R is one of the group consisting of hydrogen, alkyl, aryl, and aralkyl, and Y is one of the group consisting of —CN,

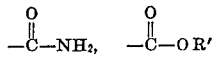

—SO₂NH₂, and —SO₃R' when X is hydrogen and is the same as X when X is one of the group consisting of

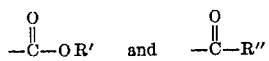

where R' is an alkyl radical and R'' is oxygen common to both the X and Y groups.

2. An amphoteric polymer comprising the hydrolyzate of a copolymer of a vinylpyridine and acrylonitrile.

3. An amphoteric polymer comprising the hydrolyzate of a copolymer of a vinylpyridine and an ester of acrylic acid.

4. An amphoteric polymer comprising the hydrolyzate of a copolymer of 2-vinylpyridine and acrylonitrile.

5. An amphoteric polymer comprising the hydrolyzate of a copolymer of 2-vinylpyridine and methyl acrylate.

6. An amphoteric polymer comprising the hydrolyzate of a copolymer of 2-vinylpyridine, acrylonitrile, and styrene.

7. An amphoteric polymer comprising the hydrolyzate of a copolymer of 2-vinylpyridine, methyl acrylate, and styrene.

8. The process of preparing an amphoteric polymer which comprises hydrolyzing the copolymer produced by copolymerizing, in the presence of a peroxide catalyst, a vinylpyridine and a compound having the formula

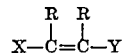

where R is one of the group consisting of hydrogen, alkyl, aryl, and aralkyl, and Y is one of the group consisting of —CN,

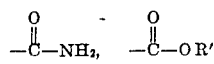

—SO₂NH₂, and —SO₃R' when X is hydrogen and is the same as X when X is one of the group consisting of

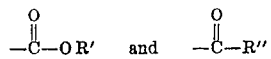

where R' is an alkyl radical and R'' is oxygen common to both the X and Y groups.

9. The process of preparing an amphoteric polymer which comprises hydrolyzing the copolymer produced by copolymerizing, in the presence of a peroxide catalyst, a vinylpyridine and acrylonitrile.

10. The process of preparing an amphoteric polymer which comprises hydrolyzing the copolymer produced by copolymerizing, in the presence of a peroxide catalyst, a vinylpyridine and an ester of acrylic acid.

11. The process of preparing an amphoteric polymer which comprises hydrolyzing the copolymer produced by copolymerizing, in the presence of a peroxide catalyst, a vinylpyridine, acrylonitrile and styrene.

12. The process of preparing an amphoteric polymer which comprises hydrolyzing the copolymer produced by copolymerizing, in the presence of a peroxide catalyst, a vinylpyridine, an ester of acrylic acid and styrene.

JULIAN L. AZORLOSA.

REFERENCES CITED

The following references are of record in the file of this patent:

UNITED STATES PATENTS

| Number | Name | Date |
|---|---|---|
| 2,072,465 | Reppe et al. | Mar. 2, 1937 |
| 2,231,905 | Hanford et al. | Feb. 18, 1941 |
| 2,448,542 | McQueen et al. | Sept. 7, 1948 |